US006982055B2

(12) United States Patent
Seth et al.

(10) Patent No.: US 6,982,055 B2
(45) Date of Patent: Jan. 3, 2006

(54) MULTIHEADED HOOK

(75) Inventors: Jayshree Seth, Woodbury, MN (US); Ronald W. Ausen, St. Paul, MN (US); Janet A. Venne, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/396,652

(22) Filed: Mar. 25, 2003

(65) Prior Publication Data

US 2004/0187276 A1 Sep. 30, 2004

(51) Int. Cl.
*B29C 47/88* (2006.01)

(52) U.S. Cl. .................. 264/145; 264/167; 264/210.5; 264/211.17; 264/342 RE

(58) Field of Classification Search ................. 24/452; 428/100; 264/145, 167, 151, 178 R, 209.3, 264/210.5, 211.17, 288.4, 342 RE
See application file for complete search history.

(56) References Cited

U.S. PATENT DOCUMENTS

| | | | | |
|---|---|---|---|---|
| 3,138,841 A | | 6/1964 | Naimer | |
| 3,266,113 A | | 8/1966 | Flanagan, Jr. | |
| 3,557,413 A | | 1/1971 | Engle | |
| 4,001,366 A | | 1/1977 | Brumlik | |
| 4,056,593 A | | 11/1977 | de Navas Albareda | |
| 4,290,174 A | | 9/1981 | Kalleberg | |
| 4,454,183 A | | 6/1984 | Wollman | |
| 4,894,060 A | | 1/1990 | Nestegard | |
| 5,011,642 A | * | 4/1991 | Welygan et al. | 264/167 |
| 5,315,740 A | | 5/1994 | Provost | |
| 5,398,387 A | * | 3/1995 | Torigoe et al. | 24/452 |
| 5,616,394 A | | 4/1997 | Gorman et al. | |
| 5,672,186 A | * | 9/1997 | Chesley et al. | 51/297 |
| 6,035,498 A | | 3/2000 | Buzzell et al. | |
| 6,127,018 A | | 10/2000 | Akeno et al. | |
| 6,209,177 B1 | | 4/2001 | Murasaki | |
| 6,484,371 B1 | * | 11/2002 | Romanko et al. | 24/306 |
| 6,814,912 B2 | * | 11/2004 | Ausen et al. | 264/145 |
| 2002/0162197 A1 | * | 11/2002 | Romanko et al. | 24/306 |
| 2003/0145440 A1 | * | 8/2003 | Ausen et al. | 24/452 |
| 2003/0182776 A1 | * | 10/2003 | Ausen et al. | 24/452 |
| 2004/0068848 A1 | * | 4/2004 | Ausen et al. | 24/452 |
| 2004/0111844 A1 | * | 6/2004 | Ausen et al. | 24/452 |

FOREIGN PATENT DOCUMENTS

| | | |
|---|---|---|
| EP | 0771537 | 5/1996 |
| WO | WO 03/059108 | 7/2003 |

* cited by examiner

*Primary Examiner*—Mark Eashoo
(74) *Attorney, Agent, or Firm*—William J. Bond

(57) ABSTRACT

The present invention provides a method for forming preferably a unitary polymeric hook fastener comprising a flexible backing, and a multiplicity of spaced hook members projecting from the upper surface of the unitary backing wherein each hook member comprises a multiplicity of hook head elements projecting in substantially the same direction. The hook members each comprise a stem portion attached at one end to the backing, and a head portion at the end of the stem portion opposite the backing. The head portion can also extend from a side of a stem portion or be omitted entirely to form alternative projections which can be other forms than a hook member. The head portion preferably projects past the stem portion on at least one of two opposite sides. At least the hook head portions have two or more hook head elements on at least one of the two opposing sides of the stem. The hook head portions preferably have been heat treated so as to decrease the hook head thickness and thereby reducing or eliminating molecular orientation in at least the hook head in the machine direction.

7 Claims, 3 Drawing Sheets

MULTIHEADED HOOK

BACKGROUND AND SUMMARY

The present invention concerns molded hook fasteners for use with hook and loop fasteners.

BACKGROUND OF THE INVENTION

There are a variety of methods known to form hook materials for hook and loop fasteners. One of the first manufacturing methods for forming hooks involved weaving loops of monofilaments into a fibrous or film backing or the like followed by cutting the filament loops to form hooks. These monofilament loops were also heated to form headed structures such as disclosed in U.S. Pat. Nos. 4,290,174; 3,138,841 or 4,454,183. These woven hooks are generally durable and work well for repeated uses. However, they are generally expensive and coarse to the touch.

For use in disposable garments, diapers and the like, it was generally desirable to provide hooks that were inexpensive and less abrasive. For these uses and the like, the solution was generally the use of continuous extrusion methods that simultaneously formed the backing and the hook elements, or precursors to the hook elements. With direct extrusion molding formation of the hook elements, see for example U.S. Pat. No. 5,315,740, the hook elements must continuously taper from the backing to the hook tip to allow the hook elements to be pulled from the molding surface. This generally inherently limits the individual hooks to those capable of engaging only in a single direction while also limiting the strength of the engaging head portion of the hook element.

An alternative direct molding process is proposed, for example, in U.S. Pat. No. 4,894,060, which permits the formation of hook elements without these limitations. Instead of the hook elements being formed as a negative of a cavity on a molding surface, the basic hook cross-section is formed by a profiled extrusion die. The die simultaneously extrudes the film backing and rib structures. The individual hook elements are then formed from the ribs by cutting the ribs transversely followed by stretching the extruded strip in the direction of the ribs. The backing elongates but the cut rib sections remain substantially unchanged. This causes the individual cut sections of the ribs to separate each from the other in the direction of elongation forming discrete hook elements. Alternatively, using this same type extrusion process, sections of the rib structures can be milled out to form discrete hook elements. With the profile extrusion process, the basic hook cross section or profile is only limited by the die shape and books can be formed that extend in two directions and have hook head portions that need not taper to allow extraction from a molding surface. This is extremely advantageous in providing higher performing and more functionably versatile hook structures. However, there is a desire to further expand the functionality of this hook forming process and to create novel hook elements with greater degrees of functionality and versatility to a variety of fibrous materials.

BRIEF DESCRIPTION OF THE INVENTION

The present invention provides a method for forming preferably a unitary polymeric hook fastener comprising a flexible backing, and a multiplicity of spaced hook members projecting from the upper surface of the unitary backing wherein each hook member comprises a multiplicity of hook head elements projecting in substantially the same direction. The hook members each comprise a stem portion attached at one end to the backing, and a head portion at the end of the stem portion opposite the backing. The head portion can also extend from a side of a stem portion or be omitted entirely to form alternative projections which can be other forms than a hook member. The head portion preferably projects past the stem portion on at least one of two opposite sides. At least the hook head portions have two or more hook head elements on at least one of the two opposing sides of the stem. The hook head portions preferably have been heat treated so as to decrease the hook head thickness and thereby reducing or eliminating molecular orientation in at least the hook head in the machine direction.

The fastener is preferably made by a novel adaptation of a known method of making hook fasteners as described, for example, in U.S. Pat. Nos. 3,266,113; 3,557,413; 4,001,366; 4,056,593; 4,189,809 and 4,894,060 or alternatively U.S. Pat. No. 6,209,177, the substances of which are incorporated by reference in their entirety. The preferred method generally includes extruding a thermoplastic resin through a die plate which die plate is shaped to form a base layer and spaced ridges, ribs or hook elements projecting above a surface of the base layer. These ridges generally form the cross-section shapes of the desired projection to be produced, which is preferably a hook member. When the die forms the spaced ridges or ribs the cross sectional shape of the hook members are formed by the die plate while the initial hook member thickness is formed by transversely cutting the ridges at spaced primary locations along their lengths to form discrete cut portions of the ridges. Between the primary cut locations are one or more secondary cuts which extend through at least the top hook head portion and preferably a portion of the stem portion, generally from 1 to 90 percent of the stem portion, preferably 5 to 80 percent. Subsequently, longitudinal stretching of the backing layer (in the direction of the ridges or in the machine direction) separates the primary cut portions of the ridges, which cut portions then form spaced apart hook members. The extruded hook members or cut rib hook members may then be heat treated resulting in shrinkage of at least the hook head portion which reduces the thickness of the hook head portion by from 5 to 90 percent, preferably 30 to 90 percent and separates the hook head portion into two or more secondary hook head portions along the secondary cuts, wherein each secondary cut defines a separate secondary hook head portion having hook head elements. This creates two or more hook head elements on a single side or face of a stem portion, each of which hook head element is able to separately engage with a loop fiber. In an alternative embodiment, the heat treatment is continued to likewise shrink at least a portion of the stem portion of the hook members.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE PREFERRED EMBODIMENTS

Figure 4:
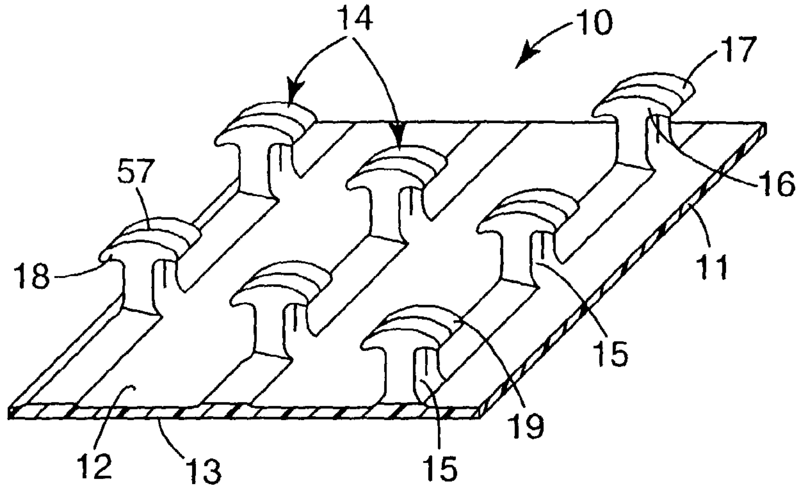
FIG. 4 is an enlarged perspective view of a precursor hook fastener.

FIG. 4 is an enlarged perspective view of an exemplary precursor polymeric hook fastener portion, which can be produced according to the present invention, generally designated by the reference numeral 10. The hook fastener portion 10 comprises a thin strong flexible film-like backing 11 having generally parallel upper and lower major surfaces 12 and 13, and a multiplicity of spaced hook members 14 projecting from at least the upper surface 12 of the backing 11. The backing can have planar surfaces or surface features as could be desired for tear resistance or reinforcement. The hook members 14 each comprise a stem portion 15 attached at one end to the backing 11 and preferably having tapered sections that widen toward the backing 11 to increase the hook anchorage and breaking strengths at their junctures with the backing 11, and a head portion 17 at the end of the stem portion 15 opposite the backing 11. The sides 16 of the head portion 17 can be flush with the sides of the stem portion 15 on one or two opposite sides. The head portion 17 has hook engaging parts or arms 19 projecting past the stem portion 15 on one or both sides of the stem portion. The hook member shown has a rounded surface opposite the stem portion 15 to help the head portion 17 enter between loops in a loop fastener portion. The head portion 17 also has transverse cylindrically concave surface portions at the junctures between the stem portion 15 and the surfaces of the head portion 17 projecting over the backing 11.

The hook member 14 also has secondary cuts 57 which bisect the hook head portion 17 creating adjacent coextensive hook head elements 18. The secondary cuts as shown extend through the hook head portions 17 and down into the stem portion 15. However, the secondary cuts do not extend to the upper surface 12 of the backing 11. Generally, the secondary cuts will terminate at least about 0.1 mm above the terminal edge of primary cuts 59, preferably at least about 0.2 mm. This allows the precursor hook fastener to preferentially separate at the primary cut portions, when elongated in the machine direction, without separating the ribs at the secondary cuts. The unseparated and/or undifferentiated hook head elements 18 form the precursor to separated or differentiated hook head elements.

Figure 5A:
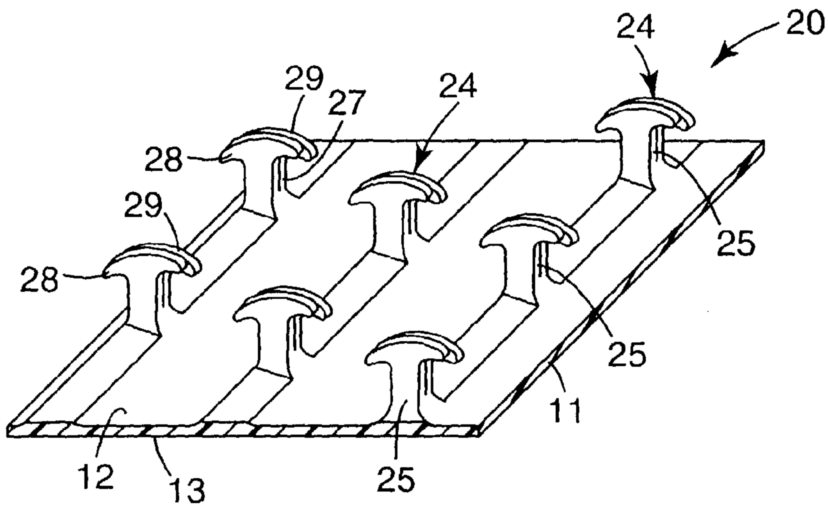
FIG. 5A is an enlarged perspective view of an invention hook fastener after suitable treatment of the hook member.

Following formation of the hook fastener portion 10, the hook fastener portion may be subjected to a treatment to cause separation and/or differentiation of the hook head elements 18. This is shown in FIG. 5A The hook fastener portion 20 backing 11 has generally parallel upper and lower major surfaces 12 and 13, and a multiplicity of spaced hook members 24 projecting from at least the upper surface 12 of the backing 11. The backing can have planar surfaces or surface features as could be desired for tear resistance or reinforcement. The hook members 24 each comprise a stem portion 25 attached at one end to the backing 11. The head portion at the end of the stem portion 25 opposite the backing 11, has been separated and/or differentiated into two distinct hook head elements 28 and 29 along secondary cut lines 27. The sides of the hook head elements 28 and 29 can be flush with the sides of the stem portion 25 on one or two opposite sides. The hook head elements 28 and 29 have hook engaging parts or arms projecting past the stem portion 25 on one or both sides of the stem portion. The hook member shown has a rounded surface opposite the stem portion 25 to help the hook head elements enter between loops in a loop fastener portion. The hook head elements 28 and 29 also have arms that diverge from one another in one or more directions. The separated and/or differentiated hook head elements 28 and 29 each having separate hooking elements or arms capable of independently engaging a loop fiber.

Figure 1:
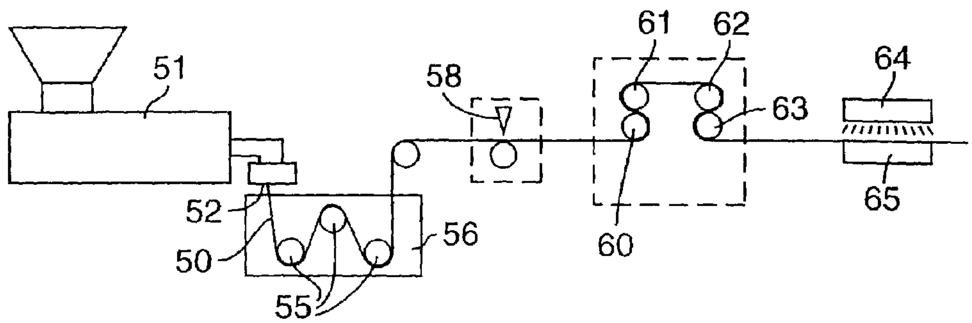
FIG. 1 schematically illustrates a method for making the hook fastener portion of FIG. 4.
Figure 2:
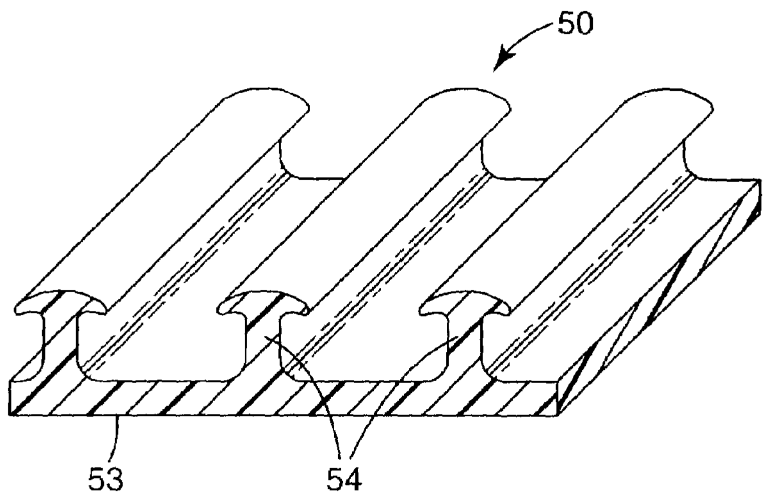
FIGS. 2 and 3 illustrate the structure of a strip at various stages of its processing in the method illustrated in FIG. 1.
Figure 3:
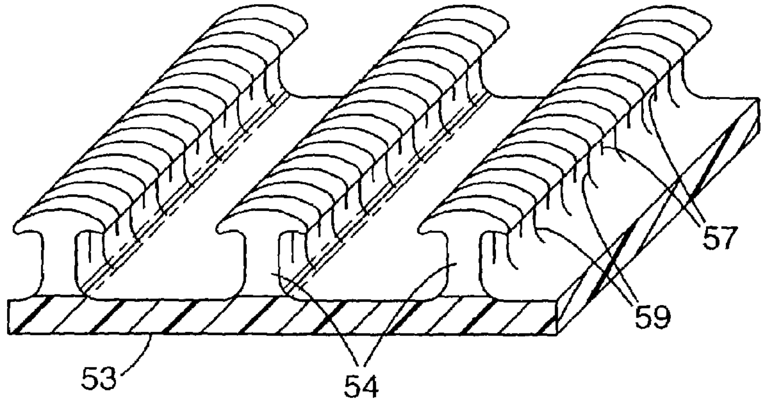

A first embodiment method for forming a hook fastener portion, such as that of FIGS. 4 and 5A is schematically illustrated in FIG. 1. Generally, the method includes first extruding a strip 50 shown in FIG. 2 of thermoplastic resin from an extruder 51 through a die 52 having an opening cut, for example, by electron discharge machining, shaped to form the strip 50 with a base 53 and elongate spaced ribs 54 projecting above an upper surface of the base layer 53 that have the cross sectional shape of the hook portions or members to be formed. The strip 50 is pulled around rollers 55 through a quench tank 56 filled with a cooling liquid (e.g., water), after which the ribs 54 (but not the base layer 53) are transversely slit or cut at spaced primary and secondary locations along their lengths by a series of cutters 58 to form primary cut portions 59 of the ribs 54 having a spacing corresponding to about the desired thicknesses of the precursor hook portions to be formed, as is shown in FIG. 3. The cut can be at any desired angle, generally from 90° to 30° from the lengthwise extension of the ribs. Optionally, the strip can be stretched prior to cutting to provide further molecular orientation to the polymers forming the ribs and/or reduce the size of the ribs and the resulting hook members formed by slitting of the ribs. The cutters 58 can cut using any conventional means such as reciprocating or rotating blades, lasers, or water jets, however preferably it cuts using blades oriented at an angle of about 60 to 80 degrees with respect to lengthwise extension of the ribs 54. The secondary cutters cut the ribs, at cut lines 57, to a predetermined depth less than that of the primary cuts 59. Generally, all the primary cuts are provided at substantially the same predetermined depth so that when the ribs are subsequently stretched to form hook members, the hook members are formed uniformly and in a predetermined array. However, the secondary cuts need not be uniform in their cut depth as long as they are provided such that they do not result in separation along these cut lines when the strip is stretched to a predetermined distance that enables formation of discrete predetermined hook members.

After cutting of the ribs 54, the base 53 of the strip 50 is longitudinally stretched at a stretch ratio of at least 2 to 1, and preferably at a stretch ratio of about 4 to 1, preferably between a first pair of nip rollers 60 and 61 and a second pair of nip rollers 62 and 63 driven at different surface speeds. This separates the cut ribs preferably at the primary cut lines 59, while leaving the secondary cut lines 57 unaffected. However, by stretching to a sufficient degree, the base can also elongate between one or more secondary cut lines 57. Optionally, the strip 50 can also be transversely stretched to provide biaxial orientation to the base 53. This allows the base to become thinner and more flexible while reducing the hook element density. Roller 61 is preferably heated to heat the base 53 prior to stretching, and the roller 62 is preferably chilled to stabilize the stretched base 53. Stretching initially causes spaces to be formed between the primary cut portions 59 of the ribs 54, which then become the hook portions or members 14 for the completed hook fastener portion 10. The formed hook members may then be treated to cause differentiation and/or separation of hook head elements formed by the secondary cut lines. This treatment preferably can be a heat treatment, preferably by a non-contact heat source 64. The temperature and duration of the heating should be selected to cause shrinkage or thickness reduction of at least the head portion by from 5 to 90 percent, which also causes differentiation and/or separation of the hook head elements 18. The heating is preferably accomplished using a non-contact heating source which can include radiant, hot air, flame, UV, microwave, ultrasonics or focused IR heat lamps. This heat treating can be over the entire strip containing the formed hook members or can be over only a portion or zone of the strip. Or different portions of the strip can be heat treated to more or less degrees of treatment. In this manner, it is possible to obtain on a single strip hook containing areas with different levels of performance without the need to extrude different shaped rib profiles. This heat treatment can change, separate and/or differentiate hook elements continuously or in gradients across a region of the hook strip. In this manner, the differentiated and/or separated hook elements can differ continuously across a defined area of the hook member. Further, the hook density can be the same in the different regions coupled with substantially the same film backing caliper or thickness (e.g., 50 to 500 microns). The heat treatment can be along different rows or can cut across different rows, so that different types of hook members or elements, such as hook elements or members having different hook thicknesses, can be obtained in a single or multiple rows in the machine direction or the lengthwise direction of the hook strip. The heat treatment can be performed at any time following creation of the hook element, such that customized performance can be created without the need for modifying the basic hook element manufacturing process.

Figure 5B:
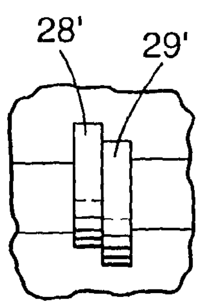
FIGS. 5B, 5C and 5D are enlarged top views of differentiated hook heads.
Figure 5C:
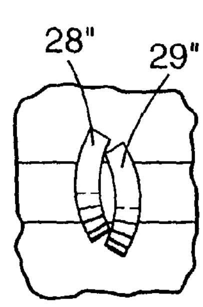
Figure 5D:
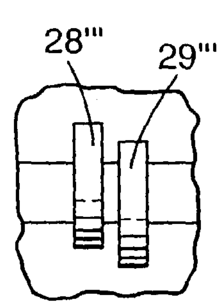

FIG. 5A shows a hook fastener portion of the FIG. 4 hook fastener portion after it has been heat treated to cause a reduction in the thickness of at least the hook head portion and differentiation and separation of the hook head elements 18 into separate and/or differentiated hook head elements 28 and 29. This generally results in the differentiated and/or separated hook head elements which for example could diverge from each other at least slightly such as by having differing amounts of arm droop or curl, such as shown in FIGS. 5B, 5C and 5D where the various differentiated and/or separated hook head elements are designated 28,', 29', 28", 29", 28'" and 29'". The other dimensions of the hook member 14 and the hook head elements 18 can also change, which is generally as a result of conservation of mass. The arms of the hook head elements 28 and 29 can be coextensive or diverge slightly in the plane of the hook member height or out of the plane of the hook member height. The hook member height generally increases a slight amount and the head portion width increases as does the arm droop. The stem and head portions can have a thickness dimension that is nonuniform and tapers from the base to the head portion due to the incomplete heat treatment along the entire hook member 14. Generally the untreated portion has a uniform thickness corresponding to the original thickness, the generally fully heat treated portion will have a uniform thickness with a transition zone separating the untreated and treated portions. Incomplete heat treatment can also result in variation of the thickness of the hook head portion from the hook element arm tips to the arm portions adjacent the stem.

Reduction in the hook member thickness is caused by relaxation of at least the melt flow induced molecular orientation of the hook head and/or stem portion which is in the machine direction, which generally corresponds to the thickness direction. Also, further reduction in thickness can occur where there is stretch induced molecular orientation, as where the ribs are stretched longitudinally prior to cutting. Melt induced molecular orientation is created by the melt extrusion process as polymer, under pressure and shear forces, is forced through the die orifice(s). The rib or ridge forming sections of the die create the molecular orientation in the formed ribs. This molecular orientation extends longitudinally or in the machine direction along the ribs or ridges. When the ribs or ridges are cut, the molecular orientation extends generally in the thickness dimension of the cut ribs, or cut hook members, however, the molecular orientation can extend at an angle of from about 0 to 45 degrees to the hook member thickness. The initial molecular orientation in the hook members is generally at least 10 percent, preferably 20 to 100 percent (as defined in the Test Method section below). When the hook members are heat treated in accordance with the invention, the molecular orientation of the hook members decrease and the hook member thickness dimension decreases. The amount of thickness reduction depends primarily on the amount of hook member molecular orientation extending in the machine direction or hook thickness dimension. The heat treatment conditions, such as time of treatment, temperature, the nature of the heat source and the like can also effect the hook member thickness reduction. As the heat treatment progresses, the reduction in hook member, or projection thickness extends from the hook head portion, or top of the projection, to the stem portion, or down the projection to the base, until the entire hook member thickness has been reduced. Generally, the thickness reduction is substantially the same in the stem and the hook head portions when both are fully heat treated or partially heat treated to the same extent. When only a part of the hook head portion and/or hook head portion and stem portion are heat treated, there is a transition zone where the thickness increases from the upper heat treated portion, generally the head portion, to the substantially non-heat treated portion of the stem portion, or stem portion and part of the hook head portion, which have a substantially unreduced thickness. When the thickness dimension shrinks, the width of the treated portion generally increases, while the overall hook member height increases slightly and the arm droop increases. The end result is a hook thickness that can either, not be economically produced directly, or cannot be produced at all by conventional methods. The heat treated projection, generally the hook head, and optionally stem, is also characterized by a molecular orientation level of less than 10 percent, preferably less than 5 percent where the base film layer orientation is substantially unreduced. Generally, the hook member stem or projection orientation immediately adjacent the base film layer will be 10 percent or higher, preferably 20 percent or higher.

The heat treatment is generally carried out at a temperature near or above the polymer melt temperature. As the heat gets significantly above the polymer melt temperature, the treatment time decreases so as to minimize any actual melting of the polymer in the hook head portion or top of the projection. The heat treatment is carried out at a time sufficient to result in reduction of the thickness of the hook head, and/or stem, but not such that there is a significant deformation of the backing or melt flow of the hook head portion or top of the projection. Heat treatment can also result in rounding of the hook head portion edges, improving tactile feel for use in garment applications.

Generally, the hook members suitable for use in the invention method, both before and after treatment, have a height dimension from the upper surface of the backing of less than 5000 $\mu$m. The stem and head portions generally have a thickness dimension of less than 1500 $\mu$m in a first direction parallel to the surfaces of the backing. The stem portions each have a width dimension in the range of 50 to 500 $\mu$m in a second direction, generally at a right angle to the first direction and parallel to the surfaces of the backing, and the head portions each have a width dimension in the second direction that is between 50 and 2000 $\mu$m greater than the width dimension of the stem portion and a total width of less than 5000 $\mu$m. There are generally at least 10, preferably 20 to 200 or 20 to 300 hook members per square centimeter of the base.

A particularly preferred novel, microhook member producible by the invention method are hook members having a height of less than 1000 $\mu$m, preferably from 300 to 800 $\mu$m, and at least a hook head element portion with a thickness of from 50 to 200 $\mu$m, preferably 50 to 180 $\mu$m.

The other dimensions for this improved microhook include a stem width, as defined above, of from 50 to 500 μm, a head portion width of from 100 to 800 μm, and an arm droop for the hook elements of from 50 to 700 μm, preferably 100 to 500 μm, and a hook member density of at least 50 and preferably from about 70 to 150, up to 300, hooks per square centimeter. This novel microhook exhibits improved overall performance to a variety of low loft loop fabrics.

Suitable polymeric materials from which the hook fastener portion can be made include thermoplastic resins comprising polyolefins, e.g. polypropylene and polyethylene, polyvinyl chloride, polystyrene, nylons, polyester such as polyethylene terephthalate and the like and copolymers and blends thereof. Preferably the resin is a polypropylene, polyethylene, polypropylene-polyethylene copolymer or blends thereof.

The backing of the fastener should be thick enough to allow it to be attached to a substrate by a desired means such as sonic welding, heat bonding, sewing or adhesives, including pressure sensitive or hot melt adhesives, and to firmly anchor the stems and provide resistance to tearing when the fastener is peeled open. However, when a fastener is used on a disposable garment, the backing should not be so thick that it is stiffer than necessary. Generally, the backing has a Gurley stiffness of 10 to 2000, preferably 10 to 200 so as to allow it to be perceived as soft when used either by itself or laminated to a further carrier backing structure such as a nonwoven, woven or film-type backing, which carrier backing should also be similarly soft for use in disposable absorbent articles. The optimum backing thickness will vary depending upon the resin from which the hook fastener portion is made, but will generally be between 20 μm and 1000 μm.

Figure 6:
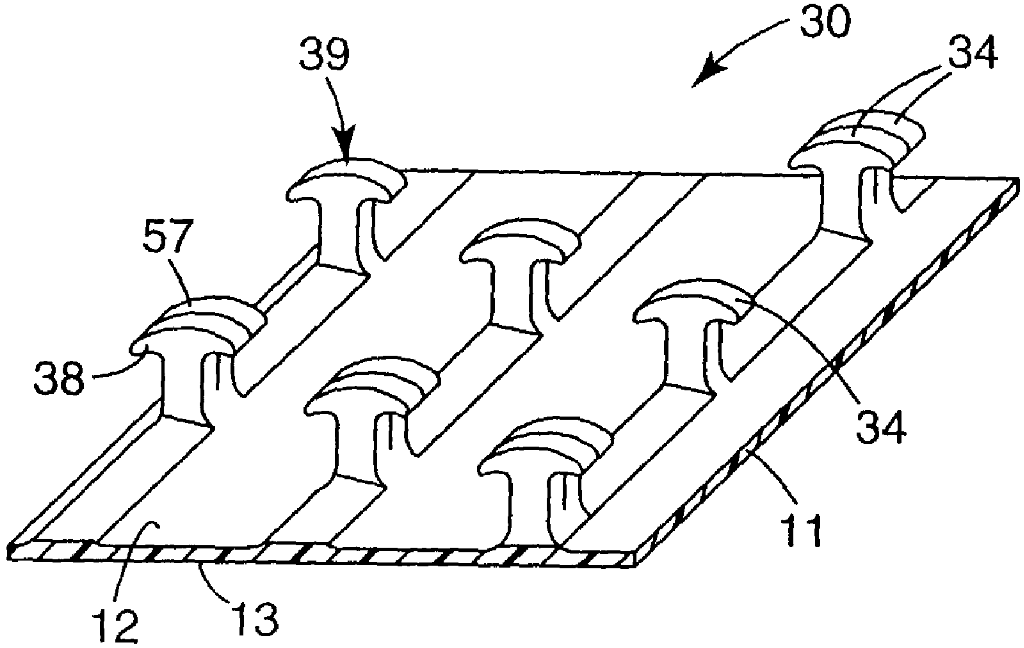
FIG. 6 is an enlarged perspective view of a second embodiment invention hook fastener suitable for treatment.

FIG. 6 is a second embodiment of a polymeric hook fastener portion which can be produced according to the present invention. The hook fastener portion 30 backing 11 has generally parallel upper and lower major surfaces 12 and 13, and a multiplicity of spaced hook members 39 projecting from at least the upper surface 12 of the backing 11. The hook members 39 each comprise a stem portion attached at one end to the backing and a head portion at the end of the stem portion opposite the backing 11. The head portions 34 are of two differing widths caused by alternate primary cuts of differing widths and alternatively secondary cuts of the wider hook members. In this embodiment differentiation will result in those hook members having secondary cuts having multiple hook head elements and the other hook member having one hook head element.

Figure 7:
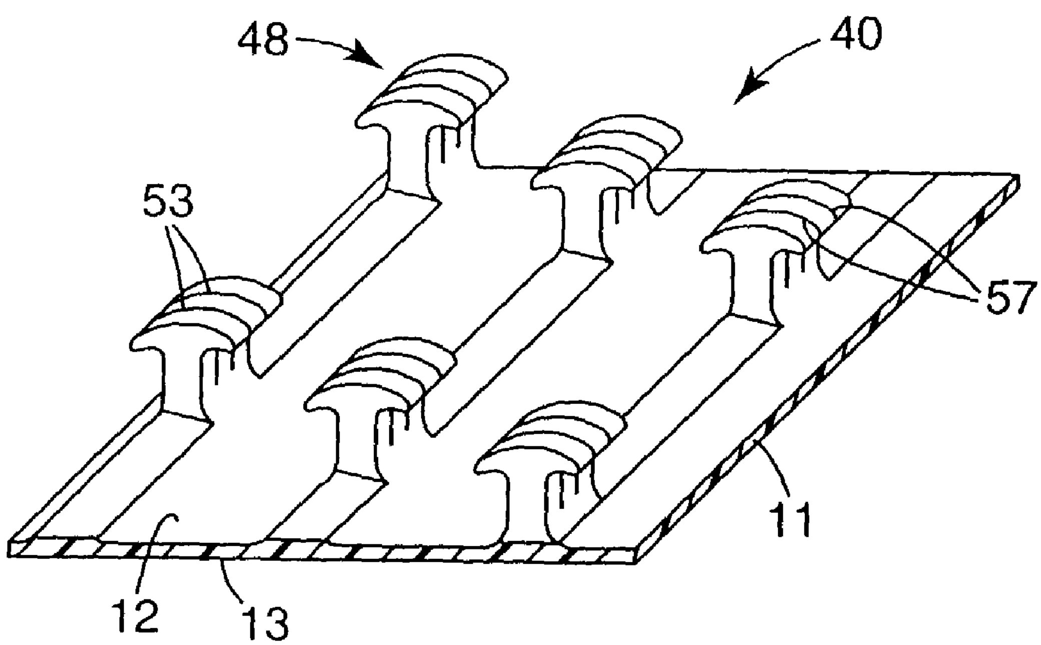
FIG. 7 is an enlarged perspective view of a third embodiment invention hook fastener suitable for treatment.

FIG. 7 is a third embodiment of a precursor polymeric hook fastener portion which can be produced according to the present invention. The hook fastener portion 40 backing 11 has generally parallel upper and lower major surfaces 12 and 13, and a multiplicity of spaced hook members 48 projecting from at least the upper surface 12 of the backing 11. In this embodiment, each hook member comprises a hook head portion and stem portion provided with two secondary cuts. When the head portion is differentiated and/or separated, the hook head portion would form three separate hook head elements separated by the secondary cuts 57. Each hook head element would have separate hook engaging parts or arms projecting past the stem portion on one or both sides of the stem portion.

The hook elements of the hook members preferably are relatively thin compared to the stem portion where the ratio of the hook element mean thickness to the stem portion mean thickness generally can be from 0.1 to 0.9, preferably 0.25 to 0.5 with a hook head element thickness of from 50 to 1000, preferably 50 to 400 μm. This allows extremely thin hook heads to be firmly supported on a significantly larger stem structure, which reduces concerns over a thin stem which could be easily deformed or broken. This enables the hook to be used in more robust applications while still being able to engage low loft inexpensive nonwoven fabrics. The provision of multiple hook head elements in a single direction also increases functionality in repeated use applications. When a hook head element is rendered nonfunctional such as be deformation or breakage a secondary, or possible further, hook head element is available to engage a loop fiber on the same hook member. This increases long term use performance and durability.

Test Methods

135 Degree Peel Test

The 135 degree peel test was used to measure the amount of force that was required to peel a sample of the hook fastener web from a sample of loop fastener material. A 5.1 cm×12.7 cm piece of a loop test material was securely placed on a 5.1 cm×12.7 cm steel panel by using a double-coated adhesive tape. The loop material was placed onto the panel with the cross direction of the loop material parallel to the long dimension of the panel. A 1.9 cm×2.5 cm strip of the hook fastener to be tested was cut with the long dimension being in the machine direction of the web. A 2.5 cm wide paper leader was attached to the smooth side of one end of the hook strip. The hook strip was then centrally placed on the loop so that there was a 1.9 cm×2.5 cm contact area between the strip and the loop material and the leading edge of the strip was along the length of the panel. The strip and loop material laminate was then rolled by hand, twice in each direction, using a 1000 gram roller at a rate of approximately 30.5 cm per minute. The sample was then placed in a 135 degree peel jig. The jig was placed into the bottom jaw of an Instron™ Model 1122 tensile tester. The loose end of the paper leader was placed in the upper jaw of the tensile tester. A crosshead speed of 30.5 cm per minute and a chart recorder set at a chart speed of 50.8 cm per minute was used to record the peel force as the hook strip was peeled from the loop material at a constant angle of 135 degrees. An average of the four highest peaks was recorded in grams. The force required to remove the hook fastener strip from the loop material was reported in grams/2.54 cm-width. A minimum of 10 tests were run and averaged for each hook and loop combination. The loop test material was a nonwoven loop made similar to that described in U.S. Pat. No. 5,616,394 Example 1, available from the 3M Company as KN-1971. The loop test material were obtained from a supply roll of the material after unwinding and discarding several revolutions to expose "fresh" material. The loop test material thus obtained was in a relatively compressed state and was used immediately in the peel test before any significant relofting of the loops could occur.

135 Degree Twist Peel Test

A 135 degree peel test was used to measure the amount of force that was required to peel a sample of the hook fastener web from a sample of low profile loop fastener material. A 1.9 cm ×2.5 cm strip of the hook fastener web to be tested was cut with the long dimension being in the machine direction of the web. A 2.5 cm wide paper leader was attached to the smooth side of one end of the hook strip. The hook materials were fastened to the low profile loop material using the following procedure: The hook material, with hook side down, was placed onto the low profile loop backsheet material of a diaper. A 4.1 kg weight measuring 7.6 cm×7.6 cm with medium grit abrasive paper on the bottom surface, was placed on top of the hook material. To engage the hook with the backsheet loop material, the diaper was held securely flat and the weight was twisted 45 degrees to the right, then 90 degrees to the left, then 90 degrees right and then 45 degrees left. The weight was then removed and the diaper was held firm against the surface of a 135 degree jig stand mounted into the lower jaw of an Instron™ Model 1122 tensile tester. The loose end of the paper leader attached to the hook material was placed in the upper jaw of the tensile tester. A crosshead speed of 30.5 cm per minute and a chart recorder set at a chart speed of 50.8 cm per minute was used to record the peel force as the hook strip was peeled from the loop material at a constant angle of 135 degrees. An average of the four highest force peaks was recorded in grams and was reported in grams/2.54 cm-width. 10 different locations were tested on each diaper with the average of the 10 being reported in Table 1. The loop test material was the nonwoven side (i.e. outward facing side) of the backsheet of a Procter & Gamble Pampers diaper size 4.

Dynamic Shear

The dynamic shear test was used to measure the amount of force required to shear the sample of mechanical fastener hook material from a sample of loop fastener material. The same loop material as described above in the 135 degree peel test was used to perform the shear test. A 2.5 cm×7.5 cm loop sample was cut with the short dimension being the machine direction of the hook. This loop sample was then reinforced with 3M strapping tape on the backside of the loop. A 1.25 cm×2.5 cm hook sample was also prepared. The long dimension is the machine direction of the hook. This sample was laminated to the end of a tab of 3M strapping tape 2.5 cm wide×7.5 cm long. The strapping tape was doubled over on itself on the end without hook to cover the adhesive. The hook was then placed centrally on the loop with long tab directions parallel to each other such that the loop tab extended past on the first end and the hook tab extended past on the second end. The hook was rolled down by hand with a 5 kg rolldown 5 replicates up and back. The assembled tabs were placed into the jaws of an Instron Model 1122 tensile tester. The hook tab placed in the top jaw, the loop tab placed in the bottom jaw. A crosshead speed of 30.5 cm per minute and a chart recorder set at a chart speed of 50.8 cm per minute was used to record the shear force as the hook strip was sheared from the loop material at a constant angle of 180 degrees. The maximum load was recorded in grams. The force required to shear the mechanical fastener strip from the loop material was reported in grams/2.54 cm-width. A minimum of 10 tests were run and averaged for each hook and loop combination.

Hook Dimensions

The dimensions of the Example hook materials were measured using a Leica microscope equipped with a zoom lens at a magnification of approximately 25x. The samples were placed on a x-y moveable stage and measured via stage movement to the nearest micron. A minimum of 3 replicates were used and averaged for each dimension.

Molecular Orientation

The orientation of the Example hook materials were measured using X-ray diffraction techniques. Data was collected using a Bruker microdiffractometer (Bruker AXS, Madison, Wis.), using copper $K_\alpha$ radiation, and HiSTAR™ 2-dimensional detector registry of scattered radiation. The diffractometer was fitted with a graphite incident beam monochromator and a 200 micrometer pinhole collimator. The X-ray source consisted of a Rigaku RU200 (Rigaku USA, Danvers, Mass.) rotating anode and copper target operated at 50 kilovolts (kV) and 100 milliamperes (mA). Data was collected in transmission geometry with the detector centered at 0 degrees (2θ) and a sample to detector distance of 6 cm. Test specimens were obtained by cutting thin sections of the hook materials in the machine direction after removing the hook arms. The incident beam was normal to the plane of the cut sections and thus was parallel to the cross direction of the extruded web. Three different positions were measured using a laser pointer and digital video camera alignment system. Measurements were taken near the center of the head portion, near the midpoint of the stem portion, and as close as possible to the bottom of the stem portion just slightly above the surface of the backing. The data was accumulated for 3600 seconds and corrected for detector sensitivity and spatial linearity using GADDS™ software (Bruker AXS Madison, Wis.). Crystallinity indices were calculated as the ratio of crystalline peak area to total peak area (crystalline+amorphous) within a 6 to 32 degree (2θ) scattering angle range. A value of one represents 100 percent crystallinity and value of zero corresponds to completely amorphous material (0 percent crystallinity). The percent molecular orientation was calculated from the radial traces of the two-dimensional diffraction data. Background and amorphous intensities were assumed to be linear between the 2θ positions defined by traces (A) and (C) defined below. The background and amorphous intensities in trace (B) were interpolated for each element and subtracted from the trace to produce (B'). Plot of trace (B') has constant intensity in absence of orientation or oscillatory intensity pattern when preferred orientation present. The magnitude of the crystalline fraction possessing no preferred orientation is defined by the minimum in the oscillatory pattern. The magnitude of the oriented crystalline fraction is defined by the intensity exceeding the oscillatory pattern minimum. The percent orientation was calculated by integration of the individual components from trace (B').

Trace (A): leading background edge and amorphous intensity; 12.4–12.8 degrees (2θ) radially along χ, 0.5 degree step size.

Trace (B): random and oriented crystalline fractions, background scattering, and amorphous intensity; 13.8–14.8 degrees (2θ) radially along χ, 0.5 degree step size.

Trace (C): trailing background edge and amorphous intensity; 15.4 to 15.8 degrees (2θ) radially along χ, 0.5 degree step size.

Trace (B'): random and oriented crystalline fractions obtained by subtraction of amorphous and background intensity from trace (B).

scattering angle center of trace (A): (12.4 to 12.8) deg.=12.6 deg. 2θ center of trace (B): (13.8 to 14.8) deg.=14.3 deg. 2θ center of trace (C): (15.4 to 15.8) deg.=15.6 deg. 2θ

Interpolation constant=(14.3–12.6)/(15.6–12.6)=0.57 for each array element [i]:

$$\text{Intensity}_{(amorphous+background)}[i]=[(C[i]-A[i])*0.57]+A[i]$$

$$B'[i]=B[i]-\text{Intensity}_{(amorphous+background)}[i]$$

From a plot of B'[i] versus [i]:

$B'_{(random)}[i]$=intensity value of minimum in oscillatory pattern $$B'_{(oriented)}[i]=B'[i]-B'_{(random)}[i]$$

Using a Simpson's Integration technique and the following areas the percent of oriented material was calculated.

$B'[i]$=total crystalline area (random+oriented)=$\text{Area}_{(total)}$ $B'_{(oriented)}[i]$=oriented crystalline area=$\text{Area}_{(oriented)}$ $B'_{(random)}[i]$=random crystalline area=$\text{Area}_{(random)}$ % oriented material=$(\text{Area}_{(oriented)}/\text{Area}_{(total)})\times100$

EXAMPLE 1

A unitary hook fastener web was made using apparatus similar to that shown in FIG. 1. A polypropylene/polyethylene impact copolymer (SRC7-644, 1.5 MFI, Dow Chemical) pigmented with 1% by weight of a polypropylene/$TiO_2$ (50:50) concentrate, was extruded with a 6.35 cm single screw extruder (24:1 L/D) using a barrel temperature profile of 177° C.–232° C.–246° C. and a die temperature of approximately 235° C. The extrudate was extruded vertically downward through a die having an opening cut by electron discharge machining. After being shaped by the die, the extrudate is quenched in a water tank at a speed of 6.1 meter/min with the water being maintained at approximately 10° C. The web was then advanced through a cutting station where the ribs (but not the base layer) were transversely cut at an angle of 23 degrees measured from the transverse direction of the web. The cutting apparatus was modified such that two different depths of cuts resulted, a primary and a secondary cut. The repeat sequence of cuts in the downweb (machine direction) along a given rib was primary-secondary-primary-primary-secondary, etc. with a primary to primary spacing sequence of 406 $\mu$m-203 $\mu$m-406 $\mu$m-203 $\mu$m, etc. After cutting the ribs, the base of the web was longitudinally stretched at a stretch ratio of approximately 3.65 to 1 between a first pair of nip rolls and a second pair of nip rolls to separate the individual hook members to approximately 7.5 hook elements/cm in the downweb direction. Separation occurred only between the deeper primary cuts resulting in a series of hook elements downweb wherein every other hook element had a secondary cut splitting the upper portion of the hook element into halves. There were approximately 14 rows of ribs or cut hooks per centimeter in the cross direction. The upper roll of the first pair of nip rolls was heated to 143° C. to soften the web prior to stretching. The general profile of this hook fastener web is depicted in FIG. 5A.

EXAMPLE 2

A unitary hook fastener web was made as in Example 1 except the cutting apparatus was modified such that the spacing between the primary and secondary cuts was 305 microns. After cutting the ribs, the base of the web was longitudinally stretched at a stretch ratio of approximately 3.65 to 1 between a first pair of nip rolls and a second pair of nip rolls to further separate the individual hook elements to approximately 6 hook members/cm in the downweb direction.

EXAMPLE 3

A unitary hook fastener web was made as in Example 1 except the cutting apparatus was modified such that the repeat sequence of cuts in the downweb (machine direction) along a given rib was primary-secondary-primary-secondary, etc. The spacing of the cuts was 254 microns. After cutting the ribs, the base of the web was longitudinally stretched at a stretch ratio of approximately 3.65 to 1 between a first pair of nip rolls and a second pair of nip rolls to further separate the individual hook elements to approximately 5 hook members/cm in the downweb direction. Separation occurred only between the deeper primary cuts resulting in a series of hook elements downweb wherein every hook element had a secondary cut splitting the upper portion of the hook element into halves.

EXAMPLE 4

A unitary hook fastener web was made as in Example 1 except the cutting apparatus was modified such that the repeat sequence of cuts in the downweb (machine direction) along a given rib was primary-secondary-secondary-primary-secondary-secondary, etc. The spacing of the cuts was 203 microns. After cutting the ribs, the base of the web was longitudinally stretched at a stretch ratio of approximately 3.65 to 1 between a first pair of nip rolls and a second pair of nip rolls to further separate the individual hook elements to approximately 4 hook members/cm in the downweb direction. Separation occurred only between the deeper primary cuts resulting in a series of hook elements downweb wherein every hook element had two secondary cuts splitting the upper portion of the hook element into thirds.

EXAMPLE 5

The web of Example 1 was subjected to a non-contact heat treatment on the hook side of the web using the following procedure. A 13 cm×43 cm piece of web was placed onto a 13 cm×43 cm steel plate (1.3 cm thick), hook-side up, and edge clamped to prevent the web from shrinking. Hot air from a Master brand hot air gun at 400° C. was blown vertically down onto the web by passing the air gun uniformly over the web for about 10 seconds.

EXAMPLE 6

The web of Example 2 was subjected to a non-contact heat treatment on the hook side of the web using the following procedure. A 13 cm×43 cm piece of web was placed onto a 13 cm×43 cm steel plate (1.3 cm thick), hook-side up, and edge clamped to prevent the web from shrinking. Hot air from a Master brand hot air gun at 400° C. was blown vertically down onto the web by passing the air gun uniformly over the web for about 10 seconds.

EXAMPLE 7

The web of Example 3 was subjected to a non-contact heat treatment on the hook side of the web using the following procedure. A 13 cm×43 cm piece of web was placed onto a 13 cm×43 cm steel plate (1.3 cm thick), hook-side up, and edge clamped to prevent the web from shrinking. Hot air from a Master brand hot air gun at 400° C. was blown vertically down onto the web by passing the air gun uniformly over the web for about 10 seconds.

EXAMPLE 8

The web of Example 4 was subjected to a non-contact heat treatment on the hook side of the web using the following procedure. A 13 cm×43 cm piece of web was placed onto a 13 cm×43 cm steel plate (1.3 cm thick), hook-side up, and edge clamped to prevent the web from shrinking. Hot air from a Master brand hot air gun at 400° C. was blown vertically down onto the web by passing the air gun uniformly over the web for about 10 seconds.

Table 1 below shows the thicknesses of the hook head elements for the hook members produced in Examples 1–8, and the peel and shear performance of the hook fastener web measured against two different loop materials. Where the hook members were split into halves using secondary cuts, two head elements were produced having the same thicknesses and are referred to as twins. Where the hook members were split into thirds using secondary cuts, three head elements were produced having the same thicknesses and are referred to as triplets. Where the hook members were not split by secondary cuts, only one head element resulted and is referred to as a single. The thicknesses reported in Table, column 3 are in the same order as the hook member type specified in column 2.

TABLE 1

| Hook Material | Hook Member Type | Hook Member Thicknesses (pm) | 135° Peel Force (grams/2.5 cm) | 135° Twist Peel Force (grams/2.5 cm) | Shear Force (grams/2.5 cm) |
|---|---|---|---|---|---|
| 1 | Single–twin | 203,406 | 486 | 350 | 4520 |
| 2 | Single–twin | 305,610 | 216 | 261 | 2830 |
| 3 | Twin—twin | 508,508 | 175 | 358 | 3370 |
| 4 | Triplet—triplet | 610,610 | 154 | 331 | 2570 |
| 5 | Single–twin | 91,183 | 750 | 432 | 4830 |
| 6 | Single–twin | 137,274 | 348 | 394 | 2950 |
| 7 | Twin—twin | 193,193 | 577 | 410 | 4270 |
| 8 | Triplet—triplet | 267,267 | 359 | 332 | 4240 |

We claim:

1. A method of forming a unitary fastener comprising the steps of extruding a thermoplastic resin in a machine direction through a die plate having a continuous base portion cavity and one or more ridge cavities extending from the base portion cavity, the extrusion being sufficient to induce melt flow molecular orientation in the polymer flowing through at least the ridge cavities forming a base portion with ridges, forming discrete projections from the ridges, which projections are separated each from the other and project from the base portion, and cutting either the ridges or the projection such that at least a portion of the discrete projections are bisected by one or more cut lines along a portion of its height.

2. The method of forming unitary fasteners of claim 1 further comprising subsequently heat treating at least a portion of the solidified projections at a temperature and time sufficient to reduce the thickness of the projections and form differentiated and/or separated projection elements from the cut portions of the projections.

3. The method of forming unitary fasteners of claim 1 wherein the projections are hook form projections having a stem portion and a head portion.

4. A method for forming unitary hook fastener according to claim 1 wherein the formed hooks are heated at a temperature and time sufficient to shrink at least a portion of the hook head portions of the hook portions by from 5 to 90 percent.

5. A method for forming unitary hook fastener according to claim 1 wherein the hook portions are formed by extruding continuous ridges having a profile of the hook element, on a base portion comprising a film cutting the ridges and subsequently stretching the base layer to separate the individual cut ridges into discrete hook portions forming the discrete projections.

6. A method for forming unitary hook fastener according to claim 4 wherein at least a portion of the hook head portions are shrunk by at least 30 percent.

7. A method for forming unitary hook fastener according to claim 5 wherein the continuous ridges are stretched in the direction of the ridges to induce molecular orientation prior to cutting of the ridges.

* * * * *